United States Patent [19]

Clancy et al.

[11] Patent Number: 5,168,427
[45] Date of Patent: Dec. 1, 1992

[54] PORTABLE COMPUTER WITH TILTABLE KEYBOARD STRUCTURE

[75] Inventors: Kevin F. Clancy, Cypress; Guntis J. Saulkalns, Houston, both of Tex.

[73] Assignee: Compaq Computer Corporation, Houston, Tex.

[21] Appl. No.: 811,810

[22] Filed: Dec. 20, 1991

[51] Int. Cl.5 ............................................... H05K 7/16
[52] U.S. Cl. ................................... 361/393; 361/380; 400/682
[58] Field of Search ............... 361/380, 390, 395, 399, 361/392, 393, 394; 364/708; 400/682, 691, 692, 693

[56] References Cited

U.S. PATENT DOCUMENTS

| 4,976,559 | 12/1990 | Inagaki | 400/682 X |
| 4,980,676 | 12/1990 | Nomura et al. | 400/682 X |
| 5,077,551 | 12/1991 | Saitou | 364/708 X |

FOREIGN PATENT DOCUMENTS 57-97138  6/1982  Japan ..................... 361/380

OTHER PUBLICATIONS

IBM Technical Disclosure Bulletin, "Adjustable Keyboard Mechanism", vol. 25, No. 4, Sep. 1982, pp. 1978-1979, Frank et al.
IBM Technical Disclosure Bulletin, "Keyboard Assembly", vol. 25, No. 8, Jan. 1983, pp. 4265-4267, Greenfield et al.
IBM Technical Disclosure Bulletin, "Adjustable Keyboard", vol. 27, No. 1A, Jun. 1984, pp. 153-154, Frank et al.
IBM Technical Disclosure Bulletin, "Access Method for Feature Expansion", vol. 29, No. 8, pp. 3491-3492, Jan. 1987.
IBM Technical Disclosure Bulletin, "Keyboard Set-In Mechanism for Transportable Computer", vol. 32, No. 9A, Feb. 1990, pp. 56-57.

Primary Examiner—Leo P. Picard
Assistant Examiner—Michael W. Phillips
Attorney, Agent, or Firm—Konneker & Bush

[57] ABSTRACT

A keyboard structure is recessed within an open-topped base housing portion of a compact portable computer such as a notebook or laptop computer. Front corner portions of the keyboard structure are secured to the base housing in a manner permitting the keyboard structure to be pivoted relative to the base housing between a storage/transport orientation in which the top side of the keyboard structure is generally parallel to the bottom side of the base housing, and an ergonomically improved tilted use orientation in which the top side of the keyboard structure slopes forwardly and downwardly toward the user of the computer. With the computer opened, the keyboard may also be used in its storage/transport orientation. Compact spring biased latch assemblies are disposed within interior side surface recesses of the base housing and are operable to releasably lock the keyboard structure in a selected one of its storage/transport and tilted use orientations. With the keyboard structure initially locked in its storage/transport orientation, manual movement and subsequent release of a pair of latch buttons causes the keyboard structure to automatically pop up to and become latched in its tilted use orientation. The keyboard structure may be subsequently returned to and locked in its storage/transport orientation by simply moving the latch buttons, pivoting the keyboard structure back to its storage/transport orientation, and then releasing the latch buttons.

5 Claims, 4 Drawing Sheets

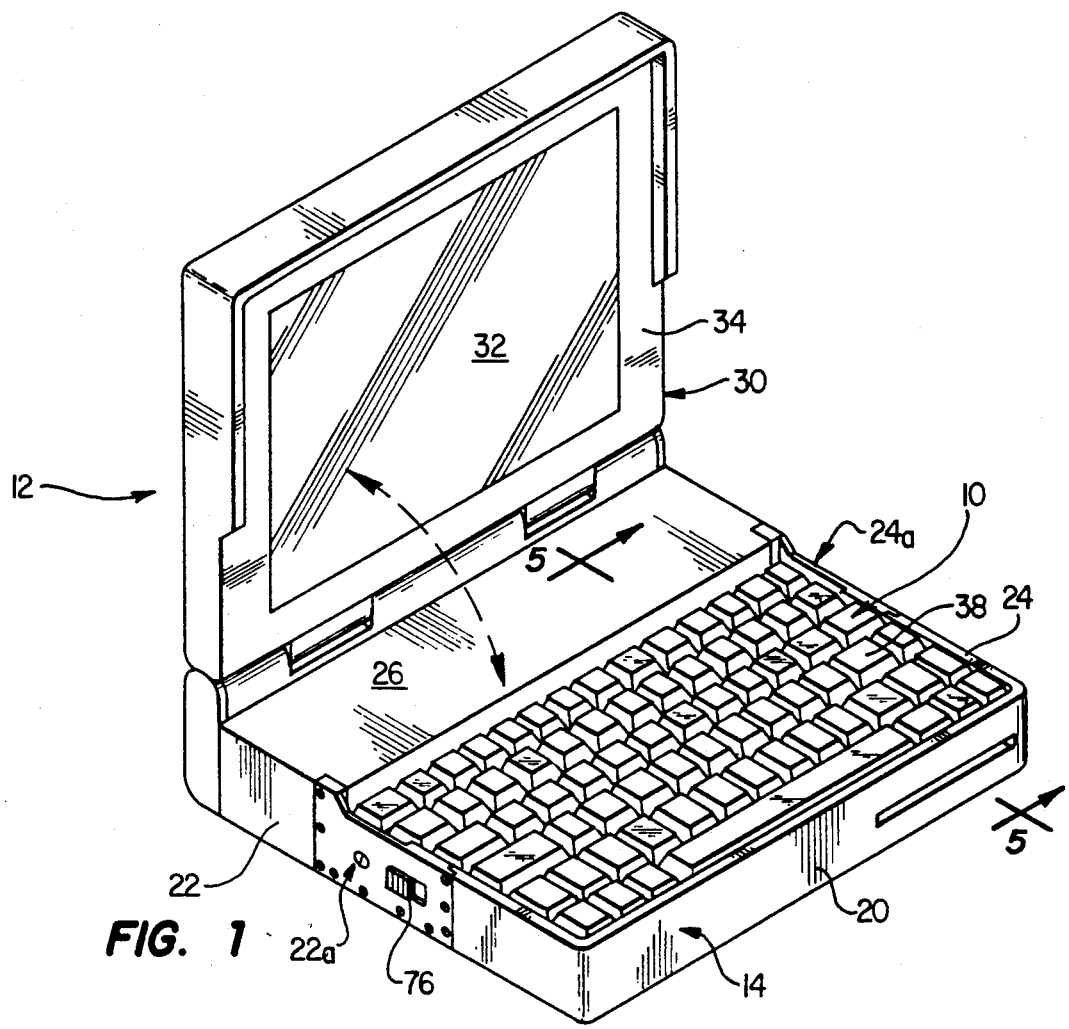
FIG. 1
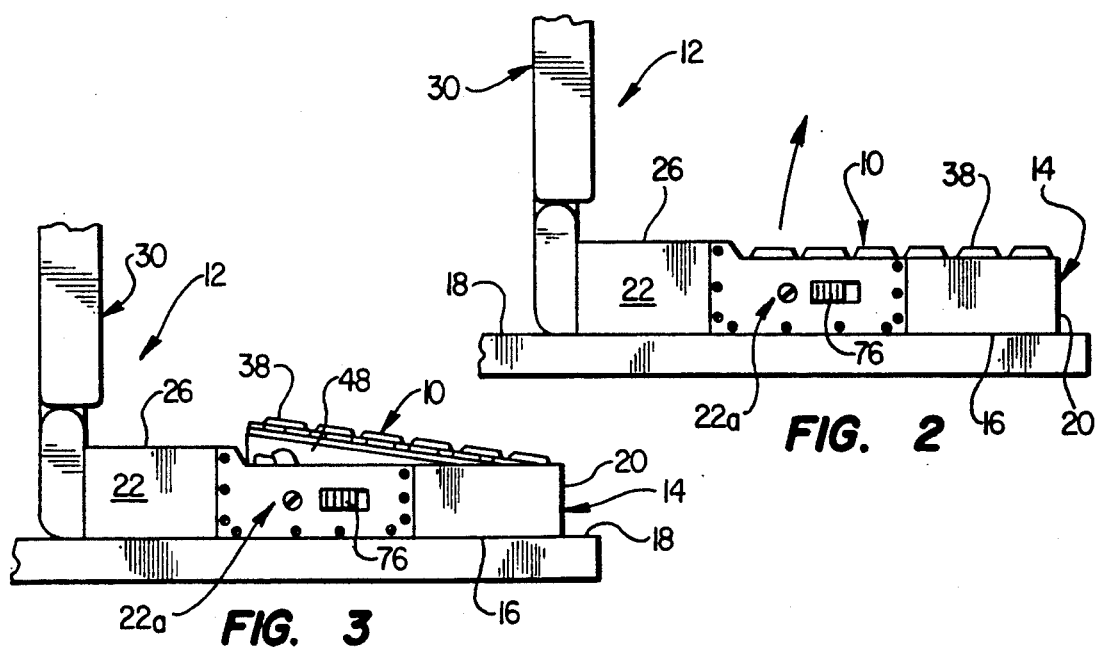
FIG. 2
FIG. 3

PORTABLE COMPUTER WITH TILTABLE KEYBOARD STRUCTURE

BACKGROUND OF THE INVENTION

1. Field of the Invention

The present invention relates generally to computer apparatus, and more particularly relates to the keyboard portions of compact portable computers such as laptop and notebook computers.

2. Description of Related Art

The housing of the separate keyboard portion of a conventional desktop computer is typically configured in a manner such that when its bottom side is rested on a generally horizontal support surface the top side of the keyboard slopes forwardly and downwardly toward the user of the computer. This top side slope positions each rearwardly successive key row at a slightly higher elevation than that of the preceding key row to thereby ergonomically improve user hand and wrist orientation during keyboard use. The conventional provision of recessed, downwardly pivotable support legs on rear underside portions of the keyboard housing allows the desktop computer user to further increase the angle of forward and downward keyboard tilt as typing hand comfort dictates.

To the present applicants, knowledge, the ability to position the keyboard in this beneficial forward and downwardly sloping use orientation has not been incorporated in compact portable computers such as notebook and laptop computers. Computers of this type conventionally comprise a thin, open-topped rectangular base housing along the back side of which a thin rectangular lid housing is secured for pivotal movement, notebook-like, between a closed storage and transport orientation in which the lid extends across and covers the top side of the base housing, and an open use position in which the lid housing projects upwardly from the base housing.

With the lid housing open, and the bottom side of the base housing resting on a suitable horizontal support surface, a monitor screen carried on the inner side surface of the lid housing faces the computer user. The keyboard structure is anchored within the base housing, with the exposed tops of the keys lying in an essentially horizontal plane parallel to the bottom side surface of the base housing. This, of course is the typing use orientation of the keyboard - an orientation decidedly less comfortable for the user of the computer than the sloping use orientation available in the separate keyboard structures of desktop computers.

As is well known, a critical design criteria for notebook computers is ultra-small size, particularly as to folded housing thickness since a primary advantage of the notebook computer is its ability to fit within a briefcase. Accordingly, the simple expedient of sloping the bottom side of the base housing to correspondingly slope the keyboard during use thereof is typically not employed since to do so would undesirably increase the thickness of the computer in its closed carrying configuration.

Moreover, it is not particularly desirable to provide the underside of the base housing with downwardly pivotable rear support legs because this would markedly reduce the overall stability of the computer during use. Thus, due to the fixed horizontal keyboard use orientation incorporated in conventional notebook and laptop computers, the users of such computers have heretofore been required to use a typing hand and wrist orientation appreciably less comfortable than that available when a desktop computer is being used.

It can be readily seen from the foregoing that it would be desirable to provide a notebook or laptop computer keyboard with a forwardly and downwardly sloping use orientation without appreciably increasing the overall exterior dimensions of the computer or decreasing its support stability during use. It is accordingly an object of the present invention to provide a compact portable computer having this desirable feature incorporated therein.

SUMMARY OF THE INVENTION

In a preferred embodiment thereof, the present invention provides a compact portable computer, such as a laptop or notebook computer, comprising an open-topped base housing and a lid housing secured along a rear side of the base housing for pivotal motion relative thereto between open and closed positions. In its closed position the lid housing extends across and covers the top side of the base housing in a manner such that the computer is externally configured in a characteristic thin rectangular storage and transport orientation. When the computer is to be used, the bottom side of the base housing is placed atop a suitable horizontal support surface, and the lid housing is pivoted upwardly and rearwardly to its open position in which the lid housing extends generally transversely to the base housing along its rear side.

The pivotal opening of the lid housing exposes to user view a monitor screen extending along the front side of the lid housing, and also exposes a keyboard structure supported within the base housing and having a top side extending across the open top side of the base housing in an essentially parallel relationship with the bottom side of the base housing. According to a feature of the present invention, the keyboard structure may then be moved relative to the base housing from this initial storage/transport orientation to and releasably locked in an ergonomically improved tilted use orientation in which the top side of the keyboard structure slopes forwardly and downwardly toward the user of the computer.

This desirable ability to improve the typing position of the keyboard structure is preferably achieved by securing the front side of the keyboard structure to the base housing for upward and downward pivotal motion relative thereto about a horizontal axis parallel to its front side, and interconnecting a rear side portion of the keyboard structure with the base housing using specially designed latch means. The front side connection of the keyboard structure permits it to be selectively pivoted between its storage/transport and tilted use orientations, and the latch means are operative to releasably lock the keyboard structure in either of these positions and, as desired, may be configured to releasably lock the keyboard structure in more than one tilted use orientation.

According to another feature of the present invention, biasing means are provided for resiliently biasing the keyboard structure toward its tilted use orientation, and stop means are provided for terminating further upward pivoting of the keyboard structure when it upwardly arrives at its tilted use orientation, and for terminating further downward pivoting of the keyboard structure when it downwardly arrives at its storage/transport orientation.

Thus, when the keyboard structure is initially locked in its storage/transport orientation, the latch means may be released to cause the keyboard structure to automatically pop up to and be stopped at its tilted use orientation for re-locking by the latch means. Release of the latch means permits the keyboard structure to be manually pivoted back to its storage/transport orientation and re-latched therein. To facilitate this positional control of the keyboard structure, the latch means are preferably spring-biased toward their locking position and have a manually movable portion positioned externally of the base housing and operable to selectively unlock the latch means.

The latch means preferably comprise a pair of specially designed latch assemblies operatively interconnected between the base housing and opposite rear corners of the keyboard structure. The two latch assemblies have relatively thin configurations and are carried within interior side surface recesses formed in opposite side wall portions of the base housing. In this manner, the latch mechanisms do not appreciably encroach upon the keyboard mounting space within the interior of the base housing, and do not increase the overall exterior size of the computer.

According to another feature of the present invention, the interior surface recesses that receive the latch assemblies are formed in removable portions of the opposite base housing side walls, and the latch assemblies are supported on these removable side wall portions for movement therewith, thereby facilitating the installation and removal of the latch assemblies. Alternatively, if desired, the latch assemblies may be recessed into nonremovable side wall sections of the housing.

BRIEF DESCRIPTION OF THE DRAWINGS

FIG. 1 is a perspective view of a representative notebook computer incorporating therein a tiltable keyboard structure embodying principles of the present invention, the computer being shown in an opened position with the keyboard in a releasably latched storage/transport and horizontal use orientation thereof;

FIG. 2 is a left side elevational view of the computer;

FIG. 3 is a view similar to that in FIG. 2, but with the computer keyboard structure being in a releasably latched, forwardly and downwardly sloped use orientation thereof;

DETAILED DESCRIPTION

Figure 4:
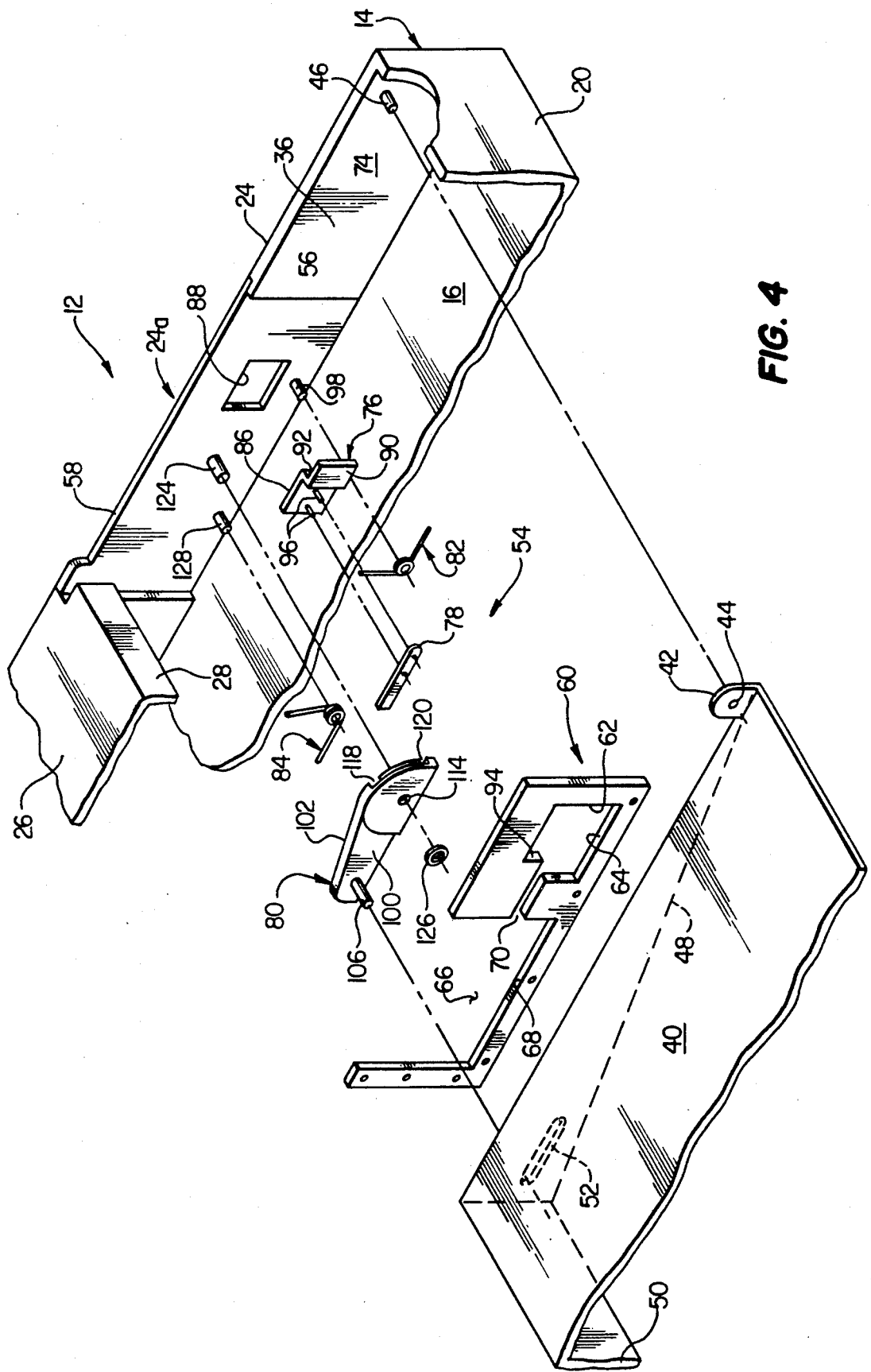
FIG. 4 is an enlarged scale, exploded perspective view of a right side portion of the computer base housing and illustrates one of two specially designed recessed latch assemblies used to releasably lock the tiltable keyboard structure in a selectively variable one of its use and storage/transport orientations.

Referring initially to FIGS. 1-3 and 5A, in a preferred embodiment thereof the present invention incorporates a uniquely positionable keyboard structure 10 in a compact portable computer such as the representatively illustrated laptop or notebook computer 12. The computer 12 includes an open-topped, relatively thin rectangular base housing 14 formed from a molded plastic material. Base housing 14 has a bottom wall 16 adapted to rest upon a suitable horizontal support surface 18; an upstanding front wall 20; upstanding left and right side walls 22,24 extending rearwardly from the opposite ends of front wall 20; a rear side portion 26; and an upstanding rear intermediate wall 28 (see FIG. 5A) extending parallel to the front wall 14.

A relatively thin rectangular plastic lid housing 30 is conventionally secured to the rear side of the base housing in a manner permitting the lid housing to be pivoted between its illustrated upright use position and a lowered storage/transport position in which the lid housing 30 extends across and covers the open top side of the base housing 14. The lid housing carries a monitor structure having a screen portion 32 extending across the front side 34 of the lid housing and visible to the computer user when the lid housing is in its upwardly pivoted use position.

Referring now to FIG. 2, the keyboard structure 10 is supported within the base housing 12 in a manner subsequently described. When the lid housing 30 is initially raised to its upright use position, the now exposed keyboard structure 10 is in its storage/transport orientation in which the top key side thereof extends across the open side of the base housing and is essentially parallel to the bottom side 16 of the base housing and thus the horizontal surface 18 upon which it rests.

In compact portable computers of conventional construction, this horizontal orientation of the keyboard is the one that the computer user is limited to during typing thereon. This is in contrast to the more comfortable forwardly and downwardly sloping keyboard orientation available in separate desktop computer keyboard sections due to the incorporation therein of sloping housing undersides and/or downwardly pivotable rear support legs. However, in a unique manner that will now be described, the keyboard structure 10 in the computer 12 may be tilted upwardly from its horizontal FIG. 2 position to the forwardly and downwardly sloping tilted use orientation shown in FIG. 3 in which the keyboard structure is releasably locked to the base housing 14 and provides the computer user with considerably more comfortable typing hand and wrist positioning. It will be appreciated, of course, that the keyboard 10 may also be used in its horizontal orientation if desired.

Figure 5A:
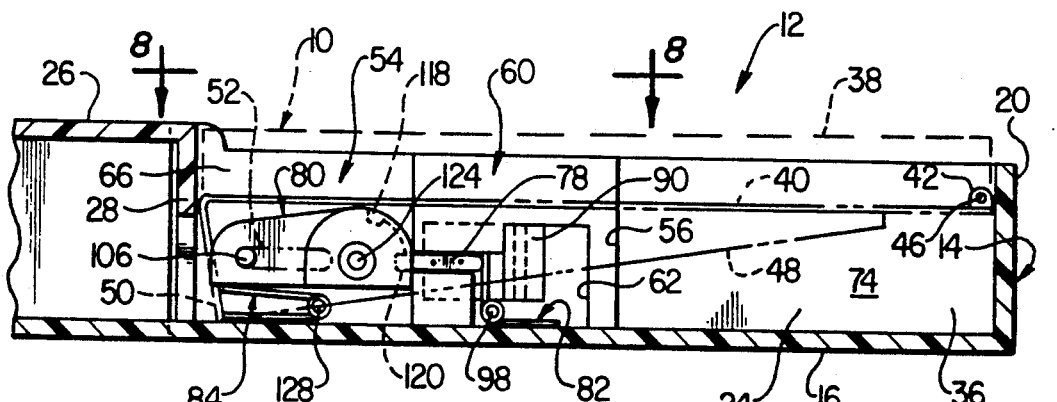
FIGS. 5A-5C are partially phantomed cross-sectional views taken through the computer along line 5—5 of FIG. 1 and sequentially illustrate the operation of the latch assembly shown in FIG. 4.

With reference now to FIGS. 4 and 5A, the keyboard structure 10 is received within the rectangular interior 36 of the base housing 14, between its front and rear walls 20 and 28, and includes a keyboard portion 38 suitably mounted atop a rectangular metal carrier plate 40 closely but movable received within the base housing interior 36. The front corners of the plate 40 (only one of which is illustrated) are provided with upstanding tabs 42. Tabs 42 have circular openings 44 that rotatably receive inwardly projecting pins 46 (only one of which is illustrated) molded on the inner side surfaces of the base housing side walls 22,24 adjacent the front base housing wall 20. This permits the keyboard structure 10 to be pivoted, about a horizontal axis parallel to the front wall 20, between its horizontal storage/transport orientation shown in FIGS. 2 and 5A, and its forwardly and downwardly sloping tilted use orientation shown in FIGS. 3 and 5C. Other types of pivot structures may also be used.

Formed along the opposite right and left sides of the plate 40 are depending triangular plate portions 48 that are joined at their rear ends to a depending rear edge portion 50 of the plate 40 to stiffen the overall plate structure. For purposes later described, a pair of elongated slots 52 are formed in the triangular plate portions 48 adjacent the depending rear plate portion 50.

Figure 5B:
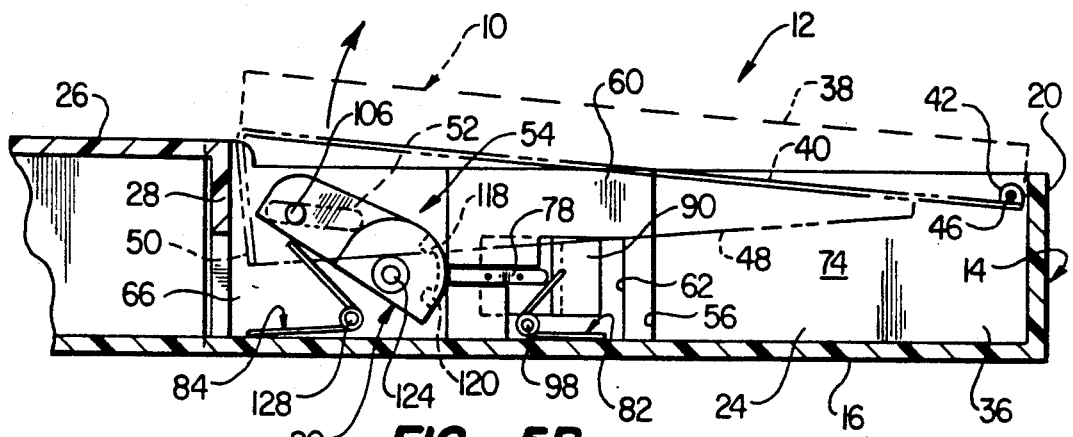
Figure 5C:
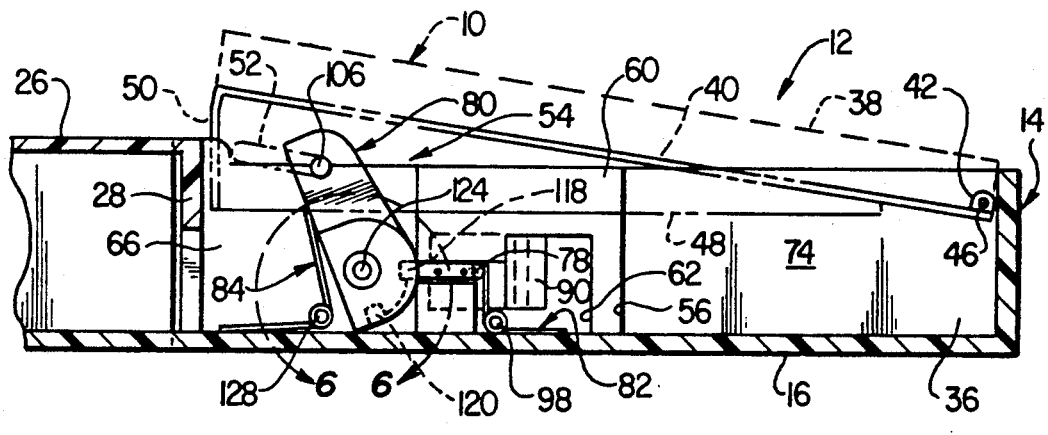

The keyboard structure 10 may be releasably locked in either its FIG. 5A storage/transport orientation or its FIG 5C tilted use orientation by means of two specially designed latch assemblies 54. One of these latch assemblies (illustrated in FIGS. 4 and 5A-5C) is positioned within the base housing 14 outboard of a rear section of the right triangular plate portion 48, and the other latch assembly (not illustrated) is similarly positioned relative to the left triangular plate portion. The two latch assemblies are identical in construction and operation, and are mirror images of one another. Accordingly, only the right latch assembly 54 is illustrated and described herein.

Figure 8:
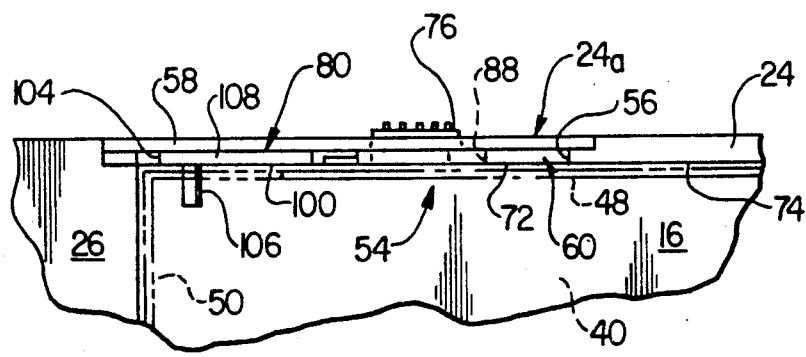
FIG. 8 is an enlarged scale top plan view of the latch assembly taken generally along line 8—8 of FIG. 5A.

Referring additionally now to FIG. 8, the illustrated right latch assembly 54 is supported on a removable portion 24a of its associated base housing side wall 24 (see FIG. 8) that is snap-fitted or otherwise removably secured in an opening 56 formed through wall 24 and extending forwardly from the rear wall 28. The other latch assembly is similarly carried on an identical removable portion 22a of the left base housing side wall 22 (see FIGS. 1-3). Wall portion 24a is formed from an outer wall section 58 that is substantially thinner that the balance of wall 24, and a wall plate member 60 suitably affixed to the inner side surface of the outer wall section 58 within the wall opening 56. Alternatively, each wall portion 24a may be of a one piece construction. As best illustrated in FIG. 4, wall plate member 60 has a right end opening 62 with a lower side surface 64; a downwardly extending left end notch 66 having a lower side surface 68; and a horizontal slot 70 extending leftwardly from opening 62 into the notch 66. As can be best seen in FIG. 8, the wall plate member 60 has an inner side surface 72 which is essentially flush with the interior side surface 74 of the balance of base housing side wall 24.

Like the left latch assembly, the illustrated right latch assembly 54 comprises a latch actuation member 76; an elongated detent member 78; a pawl member 80; and a pair of metal wire torsion springs 82 and 84. Latch member 76 has a plate-like configuration, with a body portion 86 slidably received for forward and rearward movement in a rectangular opening 88 formed through the removable outer wall section 58.

The latch member 76 is carried by the wall sections 58 and 60, captively retained in the wall opening 88. A right end portion 90 of the latch member is received in the plate member opening 62 and is joined to the balance of the latch member by a transversely offset section 92. The forward movement of the latch member 76 within wall opening 88 is stopped when the front side of offset section 92 abuts the front side surface of wall opening 88, and the rearward movement of the latch member 76 within wall opening 88 is stopped by a subsequently described interaction between detent member 78 and pawl member 80.

Detent member 78 is fixedly secured to the body portion 86 of latch actuation member 76, by pins 96 received in corresponding openings in the detent member, and is slidably received in the wall plate member slot 70 for horizontal forward and rearward movement therein. Spring 82 has a generally L-shaped configuration and operates to rearwardly bias the detent member 76, thereby biasing the latch actuation member toward its rear limit position shown in FIG. 5A. As illustrated in FIG. 5A, the spring 82 is positioned within the plate member opening 62, with the coiled central portion of the spring being mounted on an inwardly projecting wall pin 98 positioned beneath the wall opening 88. The illustrated horizontal leg of the spring 82 bears on the plate member opening surface 64, and the vertical leg of the spring leftwardly bears on the front end of the detent member 78.

Figure 6:
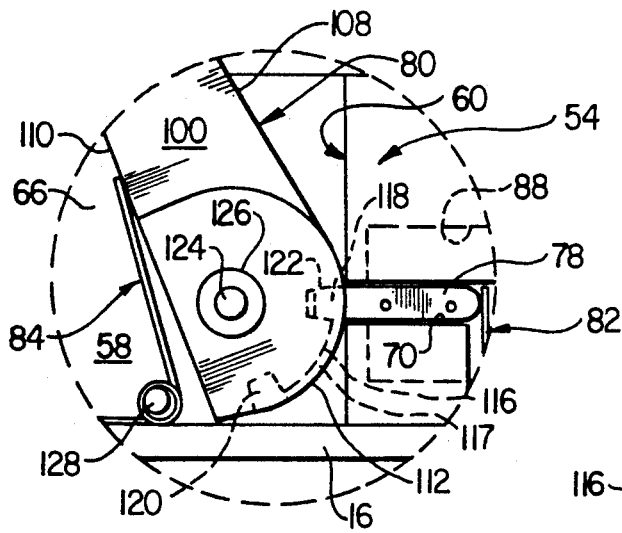
FIG. 6 is an enlarged scale detail view of the latch assembly portion generally within the dashed circle area 6—6 in FIG. 5C.
Figure 7:
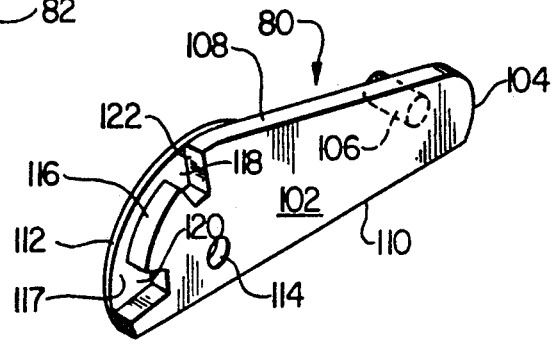
FIG. 7 is an enlarged scale perspective view of a pawl portion of the latch assembly.

Referring now to FIGS. 5A, 6 and 7, the pawl member 80 has an elongated, plate-like configuration with an inner side 100; an outer side 102; a rear end 104 from the inner side of which a pin 106 transversely projects; top and bottom side edges 108 and 110; a circularly curved front end edge 112; and a circular opening 114 positioned rearwardly of front end edge 112 just above the bottom side edge 110.

A generally rearwardly extending depression is cut into the front end surface 112, on its outer side, and forms an arcuate, forwardly facing inset surface 116 separated from the remainder of surface 112 by a ledge surface 117 transverse to the surfaces 112,116 (see FIG. 7). Extending into the inset surface 116 are circumferentially spaced upper and lower detent notches 118 and 120. For purposes later described, the top side surface of the notch 118 extends outwardly to end surface 112 and forms a stop surface 122.

Pawl 80 is recessed within the wall plate member notch 66, with the outer pawl side 102 facing the outer wall section 58, and is pivotally secured to the wall section 58 by an inwardly projecting pin 124 rotatably received in the pawl opening 114 having a suitable retaining clip 126 fixed to its outer end. A rear end portion of the detent member 78 is sandwiched between the pawl ledge surface 117 and the outer side wall section 58. The rear limit position of the latch actuation member 76 is set so that the rear end of the detent member 78 cannot be moved forwardly past the front end surface 112 of the pawl. Accordingly, the pawl ledge surface 117 assists in captively retaining the latch actuation member in the side wall opening 88. The detent member 78 is resiliently biased in a rearward direction by the action of the previously described torsion spring 82.

The pawl end pin 106 is slidably and rotatably received in the elongated slot 52 in the illustrated depending triangular portion 48 of the carrier plate 40, thereby interconnecting the carrier plate to the base housing side wall 24 and forming a lost motion connection between the latch assembly 54 and the keyboard structure 10. As can be seen in FIG. 5A, a clockwise pivotal force on the pawl 80 tends to pivot the keyboard structure 10 in a clockwise direction about pivot pin 46, and a counterclockwise pivotal force on the pawl 80 tends to pivot the keyboard structure 10 in a counterclockwise direction about the pivot pin 46.

The pawl 80, and thus the keyboard structure 10, is pivotally biased in a clockwise direction by the action of the torsional spring 84 which is received in the notch 66 of the wall plate member 60 below the pawl member 80. The coiled central portion of the spring 84 is suitably retained on a pin 128 projecting inwardly from the outer side wall section 58, with the bottom leg of the spring downwardly bearing on the bottom surface 68 of plate notch 66, and the top leg of the spring bearing against the bottom side edge 110 of the pawl 80 as best illustrated in FIG. 6.

Before describing the operation of the latch assembly 54 it should be noted that, as viewed from above in FIG. 8, it is a very thin structure which, except for its transverse pawl pin 106, is interiorly recessed within the right side wall portion of the base housing 14 and is essentially flush with the interior side wall surface 74. Accordingly, neither of the left and right latch assemblies encroaches upon the interior base housing space needed for the keyboard structure 10. Because of this feature, the size of the keyboard does not have to be reduced, nor the size of the base housing increased, to accommodate the two latch assemblies. Additionally, because the latch assemblies are carried by removable housing side wall portions they may be conveniently preassembled on such side wall portions and then be simply snapped into operative placement on the base housing.

Referring now to FIG. 5A, when the keyboard structure 10 is in its storage/transport orientation the length of the pawls 80 are generally horizontally disposed, and the keyboard structure is releasably locked in such orientation by the receipt of a rear end portions of the detent members 78 in the lower notches 120 of the pawls. When it is desired to move the keyboard structure 10 to its forwardly and downwardly sloped tilted use orientation shown in FIG. 5C, the computer user simultaneously moves the externally projecting latch actuation members 76 forwardly to forwardly remove the detent members 78 from the lower pawl notches 120.

This manual retraction of the detent members 78 from the lower pawl notches 120 allows the torsion springs 84 to forcibly pivot the pawls 80 in clockwise directions about their pivot pins 124, thereby upwardly pivoting the keyboard structure 10 toward its tilted use orientation as indicated in FIG. 5B. When the keyboard structure 10 upwardly reaches its tilted use orientation shown in FIG. 5C, each of the pawl stop surfaces 122 (FIG. 7) is brought downwardly into contact with the rear end of its associated retracted detent member 78, thereby preventing further clockwise pivotal movement of the keyboard structure and automatically aligning the upper pawl notches 118 with their associated detent members.

The computer user then releases the latch actuation members 76, thereby permitting the torsion springs 82 to rearwardly drive the detent members into their associated pawl notches 118 and firmly latch the keyboard structure 10 in its tilted use orientation as shown in FIG. 5C. When it is desired to return the keyboard structure 10 to its horizontal storage/transport orientation shown in FIG. 5A, the computer user simply moves the latch members 76 forwardly to retract the detent members 78 from the upper pawl notches 118, manually pivots the keyboard structure downwardly to its storage/transport orientation (FIG. 5A), and releases the latch members 76 to permit the springs 82 to rearwardly drive the detent members 78 into the pawl notches 120 and re-lock the keyboard structure 10 in its storage/transport orientation by virtue of the engagement of the pawl surfaces 122 with the top sides of the latch members 76.

Figure 9:
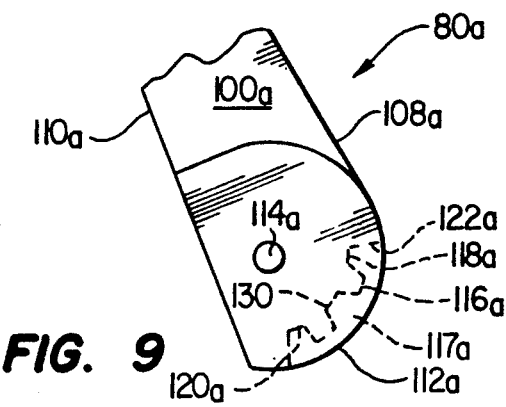
FIG. 9 illustrates, in side elevation, an alternate embodiment of the pawl portion shown in FIG.6.

A front end portion of an alternate embodiment 80a of the latch assembly pawl 80 is illustrated in FIG. 9 with features of the pawl 80a similar to those of pawl 80 being given identical reference numerals, but with the subscript "a." Pawl 80a has an additional front end notch 130 formed in its inset end surface 116a between the notches 118a and 120a and similarly configured to lockingly receive a rear end portion of a detent member 78. The provision of this extra notch 130 permits the keyboard structure 10 to be tilted to and releasably latched in an intermediate tilted use orientation positioned between its storage/transport orientation shown in FIG. 5A and its previously described tilted use orientation shown in FIG. 5C, thereby giving the computer user the ability to adjust the keyboard structure 10 to a use orientation having a somewhat lesser forward and downward slope.

The compact latch assembly described above may be inexpensively fabricated, is easy to install, remove and use, and is quickly operable to securely and releasably lock the keyboard structure in a selectively variable one of its available storage/transport and tilted use orientations. While the latch assembly has illustratively shown and described as being incorporated in the base housing of a laptop or notebook computer, it will be readily appreciated by those skilled in this art that it could be alternatively incorporated in other types of computer keyboard apparatus if desired.

The foregoing detailed description is to be clearly understood as being given by way of illustration and example only, the spirit and scope of the present invention being limited solely by the appended claims.

What is claimed is:

1. A compact portable computer, such as a laptop or notebook computer, comprising:
    a base housing having a top side opening, a bottom wall, a rear side portion, an upstanding front wall spaced forwardly apart from said rear side portion, and a pair of upstanding side walls extending rearwardly from opposite ends of said front wall;
    a lid housing secured along a side edge portion thereof to said rear side portion of said base housing for pivotal movement relative thereto between a closed storage and transport orientation in which said lid housing extends across and covers said top side opening, with a front side of the lid housing facing and generally parallel to the top side of said base housing, and an open use position in which said front side of said lid housing is generally transverse to the top side of said base housing;
    a monitor structure carried by said lid housing and having a screen portion extending along said front side thereof;
    a keyboard structure received in said base housing and having an exposed top key side extending across said top side opening of said base housing, said keyboard structure having a rear portion, the inner side surfaces of said side walls of said base housing having recesses disposed therein and positioned adjacent said rear portion of said keyboard structure;
    means attaching a front side portion of said keyboard structure to said base housing in a manner permitting said keyboard structure to be pivoted relative thereto between a storage/transport orientation in which said top key side of said keyboard structure is generally parallel to said bottom wall of said base housing, and a tilted use orientation in which said top key side of said keyboard structure slopes forwardly and downwardly;

latch means interconnected between said keyboard structure and said base housing and operative to releasably lock said keyboard structure in either of said storage/transport and tilted use orientations thereof;

means resiliently biasing said keyboard structure toward said tilted use orientation thereof; and stop means preventing downward pivoting of said keyboard structure past said storage/transport orientation thereof, and preventing upward pivoting of said keyboard structure past said tilted use orientation thereof, said latch means including a pair of latch assemblies supported within said recesses and operatively interconnected between said base housing and said rear portion of said keyboard structure, each of said latch assemblies including:

a pawl member having a first end pivotally connected to said rear portion of said keyboard structure, a second end connected to one of said base housing side walls for rotation relative thereto about an axis generally parallel to said front wall of said base housing, and a plurality of detent slots circumferentially spaced about said axis and extending generally transversely thereto, a detent member supported for movement, in a direction transverse to said axis, into and out of a selected one of said slots pivoted into alignment therewith, spring means biasing said detent member toward said second end of said pawl member, and means manually operative from the exterior of said base housing to selectively move said detent member away from said second end of said pawl member against the force of said spring means.

2. The computer of claim 1 wherein said biasing means include:

spring means, interconnected between said base housing and said pawl members, pivotally biasing said pawl members about said axes thereof in a manner tending to upwardly pivot said first ends of said pawl members.

3. The computer of claim 1 wherein:

said keyboard structure has a pair of elongated slots formed in opposite side portions thereof adjacent the rear side of said keyboard structure, and said first end portions of said pawl members have transverse pins slidably and rotatably received in said pair of elongated slots.

4. A compact portable computer, such as a laptop or notebook computer, comprising:

a base housing having a top side opening, a bottom wall, a rear side portion, an upstanding front wall spaced forwardly apart from said rear side portion, and a pair of upstanding side walls extending rearwardly from opposite ends of said front wall;

a lid housing secured along a side edge portion thereof to said rear side portion of said base housing for pivotal movement relative thereto between a closed storage and transport orientation in which said lid housing extends across and covers said top side opening, with a front side of the lid housing facing and generally parallel to the top side of said base housing, and an open use portion in which said front side of said lid housing is generally transverse to the top side of said base housing;

a monitor structure carried by said lid housing and having a screen portion extending along said front side thereof;

a keyboard structure received in said base housing and having an exposed top key side extending across said top side opening of said base housing;

means attaching a front side portion of said keyboard structure to said base housing in a manner permitting said keyboard structure to be pivoted relative thereto between a storage/transport orientation in which said top key side of said keyboard structure is generally parallel to said bottom wall of said base housing, and a tilted use orientation in which said top key side of said keyboard structure slopes forwardly and downwardly;

latch means interconnected between said keyboard structure and said base housing and operative to releasably lock said keyboard structure in either of said storage/transport and tilted use orientations thereof;

means resiliently biasing said keyboard structure toward said tilted use orientation thereof; and stop means preventing downward pivoting of said keyboard structure past said storage/transport orientation thereof, and preventing upward pivoting of said keyboard structure past said tilted use orientation thereof, said pair of side walls of said base housing having removable rear portions, and said latch means being carried be said removable rear side wall portions for movement therewith.

5. Computer keyboard apparatus comprising:

an open-topped housing having a flat bottom side adapted to rest upon a horizontal support surface, a front wall, and a pair of opposite side walls extending rearwardly from opposite ends of said side walls;

a keyboard structure received in said base housing and having a front side portion;

means securing said front side portion of said keyboard structure to said base housing in a manner permitting said keyboard structure to be pivoted relative to said base housing between a storage/transport orientation in which the top side of said keyboard structure extends across the open top side of said base housing and is generally parallel to said bottom side of said base housing, and a tilted use orientation in which said top side of said keyboard structure is in a forwardly and downwardly sloping use orientation; and means for adjusting the pivotal orientation of said keyboard structure relative to said base housing, said means for adjusting including a movable control portion manually operable from the exterior of said base housing and being operative in response to movement of said control portion to sequentially:

(1) lock said keyboard structure in said storage/transport orientation thereof, (2) unlock said keyboard structure, pivotally drive it to and stop it in said tilted use orientation, and then lock it in said tilted use orientation, (3) unlock said keyboard structure to permit it to be manually returned to said storage/transport orientation thereof, and then (4) re-lock said keyboard structure in said storage/transport orientation thereof, the interior surfaces of said housing side walls having recesses disposed therein adjacent rear portions of said keyboard structure, said means for adjusting including a pair of latch assemblies carried within said recesses and operatively interconnected between said housing side walls and said rear portions of said keyboard structure, said housing side walls having removable portions therein positioned adjacent said rear portions of said keyboard structure, said recesses being disposed in said removable side wall portions, and said latch assemblies being supported on said side wall portions for removal therewith.

* * * * *

UNITED STATES PATENT AND TRADEMARK OFFICE
CERTIFICATE OF CORRECTION

PATENT NO. : 5,168,427
DATED : December 1, 1992
INVENTOR(S) : Clancy, Kevin F., et al.

It is certified that error appears in the above-identified patent and that said Letters Patent is hereby corrected as shown below:

Column 1, line 27, "applicants," should be --applicants'--.

Column 3, line 61, "6-6in" should be --6-6 in--.

Column 9, line 37, "operative" should be --operable--.

Signed and Sealed this

Twenty-fifth Day of January, 1994

Attest:

BRUCE LEHMAN

Attesting Officer     Commissioner of Patents and Trademarks